Patented Dec. 23, 1941

2,267,151

UNITED STATES PATENT OFFICE 2,267,151

EMBEDDING MEDIUM

Peter Gray, Pittsburgh, Pa., assignor to Stoner-Mudge, Inc., a corporation of Pennsylvania No Drawing. Application September 19, 1940, Serial No. 357,401

2 Claims. (Cl. 35—20)

My invention relates to an improved embedding medium, and finds practical application in the preparation of thin sections of biological and pathological specimens for the microscopic study of the structure and morphology of tissues. This application is a continuation in part of an application filed December 14, 1939, Serial No. 309,301.

In the microscpoic study of thin sections of biological and pathological specimens it is customary first to dehydrate the specimen (organ, tissue, or collection of tissues) by immersing it in a suitable organic liquid such as ethyl alcohol or β hydroxy diethyl ether, known to the art as "cellosolve." After a suitable period of immersion in such dehydrating liquid the specimen is removed and is at once immersed in a bath of a volatile liquid hydrocarbon, such as benzene, toluol, xylol, hi-flash naphtha, mineral spirits, etc. The hydrocarbon liquid containing the specimen is then poured into a suitable vessel containing melted paraffin wax, and the whole is then kept in an oven at a temperature not exceeding 150° F. until the volatile hydrocarbon has evaporated out of the resulting mixture and the specimen remains immersed in molten paraffin, free from air bubbles, trapped water, etc. The container of molten paraffin is then removed from the oven and allowed to harden by cooling. Usually it is hardened by placing it in an ice bath. When completely set, the new solid cake of paraffin containing the specimen embedded within it is removed from the container and thin sections are shaved off by means of a microtome, down to that plane through the specimen which it is desired to investigate microscopically. These sections, either individually or in a continuous ribbon, as is well known, are removed to a glass microscope slide on which has been placed a layer of water containing small quantities of albumin, gelatin, or other organic protein derivative. If the sections are not flat it is customary to warm the solution to cause sufficient softening of the medium so that the sections lie down flat or may be pressed flat. The solution is then evaporated off at temperatures below the melting point of the embedding medium; the flattened embedded sections adhere to the glass plate by virtue of the residual layer of albumin, gelatin, or other organic protein material. The embedding medium is then removed by dissolving in a solvent such as benzol, toluol, solvent naphtha, or other suitable hydrocarbon in order that the now wax- and resin-free sections may subsequently be differentially stained (if staining be desired) before sealing under the usual thin glass cover slip in any of the resinous compositions such as Canada balsam or gum dammar, familiarly employed for such mounting.

The paraffin wax used in the conventional procedure described above is when cold essentially crystalline and granular, as is well known, and possesses little internal strength; so that, while reasonably thick sections have satisfactory strength to support and tightly hold the contained cross section of specimen, if the microtomed section be thinner than a value approximating 4–5μ (micron), the internal strength of the paraffin will be insufficient, and the sectioned sample will be likely to crumble and to be destroyed and rendered useless for microscopic examination.

The invention is found in modification of the paraffin wax by addition of other material to it, in consequence of which the essentially crystalline nature of paraffin is changed, and the internal strength of the modified substance is increased to such extent that sections of 2–3μ thickness, or even less, may satisfactorily be prepared without crumbling or degradation.

Another disadvantage attending the use of simple paraffin wax as the embedding medium (and it is only waxes alone that have heretofore been used for the purpose) is consequent upon the facts that its melting point is fairly low, not exceeding 122° F., and that it does not have a sharply defined softening point. While the mounted specimen may be cut satisfactorily by microtome at room temperatures, approximating 58–60° F., if the temperature approaches or exceeds 75–80° F. (which temperatures are frequently encountered during the greater part of the year), the simple paraffin medium becomes too soft to be handled on the microtome; and tedious and cumbersome arrangements must then be provided to keep the specimen and the knife at a reduced temperature, low enough to insure satisfactory cutting. Extreme difficulty is often experienced in insuring these requisite lower temperatures during the entire process of cutting and mounting the specimen when embedded in simple paraffin wax. Accordingly, it is another object of my invention so to modify the paraffin embedding medium that it shall remain firm and responsive to the operation of the microtome upon it at temperatures up to and exceeding 80–95° F.

Another object of my invention is to eliminate the granular structure of the paraffinic embedding medium of the prior art, and to provide a medium of essentially homogeneous, amorphous texture.

My invention consists in the addition to simple paraffin wax of relatively small proportions, ranging from 2 to 40 per cent by weight, of a compatible resin, selected from a group consisting of the hydrogenated polymers of cyclopentadiene, di-cyclopentadiene, indene, and cumarone, thus producing an embedding medium that, melting below 150° F., is firm and tough at ordinary temperatures, ranging upward to 95° F.; a medium that has an amorphous homogeneous texture; a medium that can be microtomed to a thickness less than 2–3μ and afford sections not too fragile to be handled satisfactorily and not susceptible to crumbling and deformation of the embedded specimen. Using my improved embedding medium, in the manner familiar to the art and essentially as previously described, it is possible to obtain sections of embedded biological specimens whose thickness is of a minuteness not heretofore obtainable, less than 3μ, and to accomplish this without the necessity of laboriously cooling the embedded whole specimen, the microtome, and the knife.

The material that in the practice of my invention I add to paraffin is of a group that consists of the hydrogenated polymers of di-olefinic hydrocarbons and their oxygenated analogs, specifically cyclopentadiene, di-cyclopentadiene, cumarone, indene, and their homologs and polymerizable alkyl and aryl derivatives. I have experimented widely, and have found no substance in this group that is not in some degree serviceable for my purposes; and I have every reason to believe that all such substances are so serviceable, subject only to the limitation that they be compatible with, and soluble in, paraffin and paraffinic hydrocarbons. Such polymers, interpolymers, and copolymers are well known to the chemical art, and are available on the market, as, for example, the substances bearing the trade names Nevillite (Nos. 1, 2, 3, and V), Piccolite, and hydogenated cumar.

For certain kinds of microtoming, I may also incorporate a few per cent (usually 2, and not to exceed 5 per cent) of a natural or synthetic rubber or rubber-like polymeric substance, to impart slight elasticity and to eliminate even the last tendency to sharp fracturing of the paraffin. The synthetic rubber here contemplated is a material of a group that consists of polymerized chloroprene, polymerized butadiene, polymerized isobutylene, polymerized isoprene, polymerized divinyl acetylene, and their homologs.

I may substitute for a portion of the crystalline paraffin other paraffinic waxes, such as the branch-chained and naphthenic paraffins resulting from the purification and extraction of lubricating oils from petroleum. Such petroleum waxes are to be had under the trade names of Barnsdall Wax, Petrowax, and Superla Wax.

Finally, I may add to my modified paraffin embedding medium a few per cent (not exceeding 10 parts to 100 parts of the whole) of stearic acid, beeswax, spermacetti, carnauba or other naturally occurring waxy substance, for conferring additional hardness and other desirable properties without loss of elasticity and mechanical strength.

The essential composition of my modified embedding medium will be made clear by the following illustrative examples. It will be understood that the proportions given are preferred proportions, and that the proportions may be varied within the over-all limits specified. The general composition I contemplate is as follows:

| | Substance | Limits |
|---|---|---|
| | | Percent |
| 1 | Hydrogenated polymer of cyclo and di-cyclopentadiene, indene, cumarone | 2–40 |
| 2 | Natural rubber, or synthetic rubbery hydrocarbon polymer, such as polyisoprene, polychloroprene, polybutylene, polybutadiene, and their homologs | 0–5 |
| 3 | Petrowax, Barnsdall Wax, Superla Wax, and other branched chain or naphthenic hydrocarbon waxes | 0–50 |
| 4 | Stearic acid, beeswax, carnauba wax, spermacetti wax, gum dammar, and similar natural waxes and gums | 0–10 |
| 5 | Crystalline (straight chain) paraffin | Balance |

Exemplary specific compositions are as follows:

Example 1

| | Parts |
|---|---|
| Paraffin | 80 |
| Hydrogenated polymer of cumarone and indene and di-cyclopentadiene | 20 |

Example 2

| | Parts |
|---|---|
| Paraffin | 75 |
| Rubber | 3 |
| Hydrogenated cyclopentadiene polymer | 22 |

Example 3

| | Parts |
|---|---|
| Paraffin | 70 |
| Polymerized butadiene | 2 |
| Beeswax | 2 |
| Polymerized di-cyclopentadiene, hydrogenated | 26 |

Example 4

| | Parts |
|---|---|
| Paraffin | 50 |
| Barnsdall wax | 5 |
| Polymerized isobutylene | 5 |
| Polymer of di-cyclopentadiene, hydrogenated | 40 |

Example 5

| | Parts |
|---|---|
| Paraffin | 60 |
| Petroleum wax | 25 |
| Polymerized di-cyclopentadiene, hydrogenated | 15 |

Example 6

| | Parts |
|---|---|
| Paraffin | 50 |
| Rubber | 5 |
| Superla wax | 20 |
| Beeswax | 5 |
| Spermacetti wax | 5 |
| Hydrogenated polymer of cyclopentadiene | 15 |

Example 7

| | Parts |
|---|---|
| Paraffin | 60 |
| Rubber | 2 |
| Stearic acid | 3 |
| Gum dammar | 10 |
| Petroleum wax | 15 |
| Cumarone-indene polymer, hydrogenated | 10 |

The preparation of my improved embedding medium offers no difficulty. I prefer to bring the paraffin into a condition of liquidity by application of heat, and, with or without mechanical agitation, to dissolve therein the resinous component directly; similarly, the rubber or other rubbery flexibilizer may be added by stirring it into the melted paraffin and resin mixture. The other possible ingredients may be added at the same time, or on subsequent melting of the mixture.

The term embedding medium is used throughout this specification in its technical sense, to designate specifically a material in which for purposes of microtomy the specimen is initially embedded and which ultimately is dissolved away from the section when laid upon the microscope slide.

Having described my invention, and having pointed out the advantages attendant upon its use I claim as my invention:

1. An aromatic-hydrocarbon-soluble embedding medium for specimens for microscopic study susceptible to microtomy and removal by solution, consisting of paraffin wax modified by admixture with it of a substance of a group that consists of the hydrogenated polymers of cyclopentadiene, di-cyclopentadiene, cumarone, indene, their homologs, and their polymerizable alkyl and aryl derivatives, together with a flexibilizing agent selected from a group that consists of rubber, polymerized chloroprene, polymerized butadiene, polymerized isobutylene, polymerized isoprene, polymerized divinyl acetylene and their homologs.

2. An aromatic-hydrocarbon-soluble embedding medium for specimens for microscopic study susceptible to microtomy and removal by solution, consisting of paraffin wax modified by admixture with it of a substance of a group that consists of the hydrogenated polymers of cyclopentadiene, di-cyclopentadiene, cumarone, indene, their homologs, and their polymerizable alkyl and aryl derivatives, together with rubber as a flexibilizing agent.

PETER GRAY.